United States Patent [19]

Everett et al.

[11] 4,006,812

[45] Feb. 8, 1977

[54] AUTOMATIC FEEDING HOPPER

[75] Inventors: George Everett, Unionville; Michael Shapcott, Plainville, both of Conn.

[73] Assignee: Zapata Industries, Inc., Frackville, Pa.

[22] Filed: Dec. 12, 1974

[21] Appl. No.: 532,186

Related U.S. Application Data

[63] Continuation-in-part of Ser. No. 319,457, Dec. 29, 1972, abandoned.

[52] U.S. Cl. .............................. 198/347; 198/392; 198/396
[51] Int. Cl.² ...................................... B65G 47/24
[58] Field of Search ................. 198/37, 44, 48, 50, 198/54, 56, 57, 285, 268–271, 275; 214/7, 8.5 G; 221/9, 10, 167, 175, 182

[56] References Cited

UNITED STATES PATENTS

| | | | |
|---|---|---|---|
| 2,745,537 | 5/1956 | Cadman | 198/287 |
| 2,772,005 | 11/1956 | Dubin et al. | 198/50 |
| 3,101,832 | 8/1963 | Wyle et al. | 198/268 |
| 3,305,067 | 2/1967 | Mayer | 198/59 |
| 3,578,140 | 5/1971 | Myer et al. | 198/271 |
| 3,592,336 | 7/1971 | Thurston et al. | 198/37 |
| 3,623,594 | 11/1971 | Ravn et al. | 198/287 |
| 3,650,369 | 3/1972 | Vergobbi | 198/271 |
| 3,710,924 | 1/1973 | Schultz | 198/287 |
| 3,828,921 | 8/1974 | Tackett | 198/287 |
| 3,860,145 | 1/1975 | Miller | 198/287 |

Primary Examiner—Evon C. Blunk
Assistant Examiner—Jeffrey V. Nase
Attorney, Agent, or Firm—Shapiro and Shapiro

[57] ABSTRACT

A hopper is constructed to control the rapid, uniform and constant flow of disk-like objects, more particularly bottle crowns. The hopper employs a reservoir and means for feeding the disk-like objects to the reservoir. An electric eye responsive to the level of disk-like objects in the reservoir is connected to the feeding means to maintain a predetermined level of the objects in the reservoir. A conveyor is positioned to adjoin the reservoir to remove and deliver the disk-like objects at a uniform rate to the point of use of the hoppered objects.

If the disk-like objects are asymmetrical, an orienting device is provided between the feeding means and the reservoir to orient the objects as they are delivered to the reservoir.

16 Claims, 13 Drawing Figures

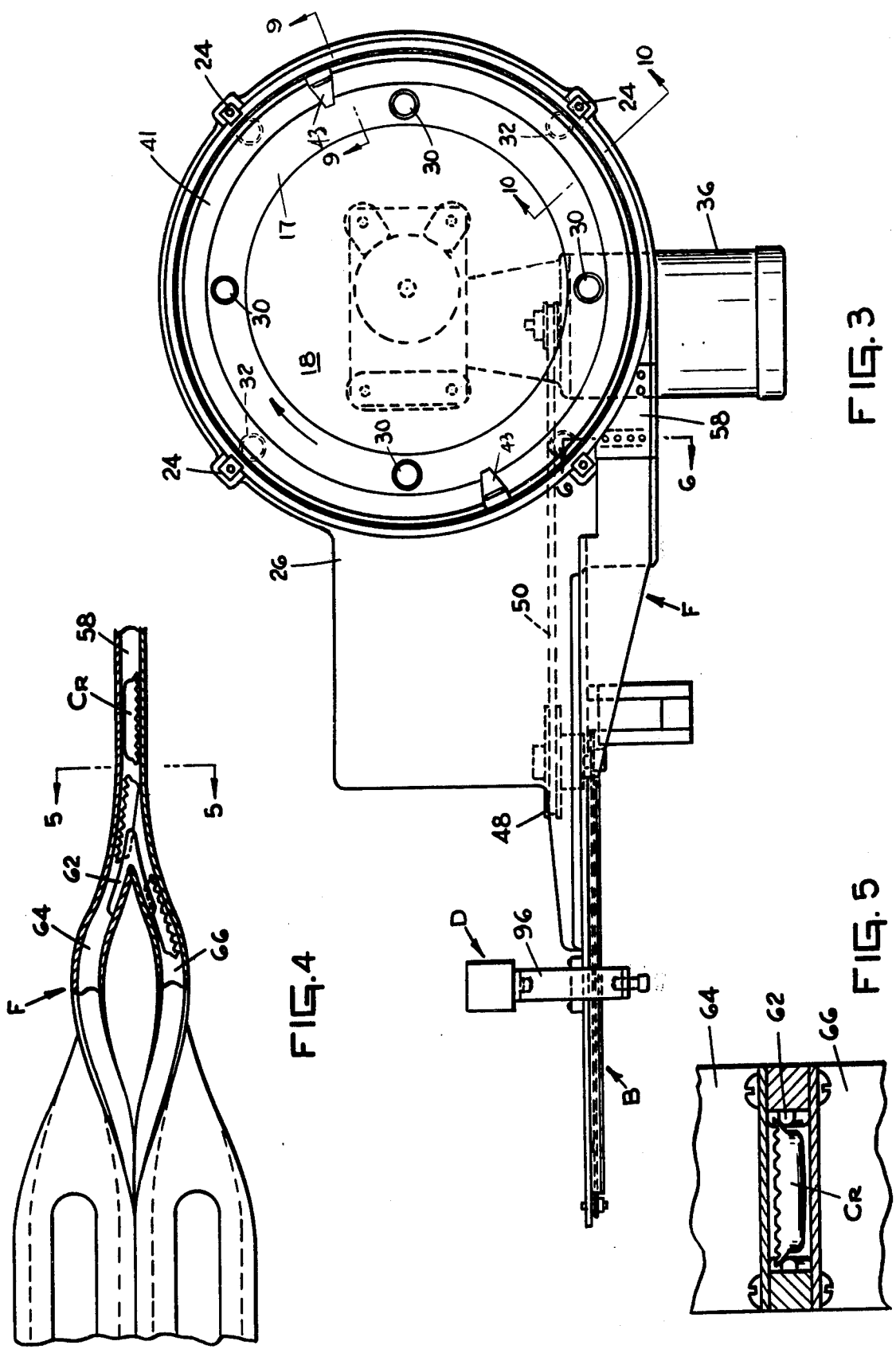

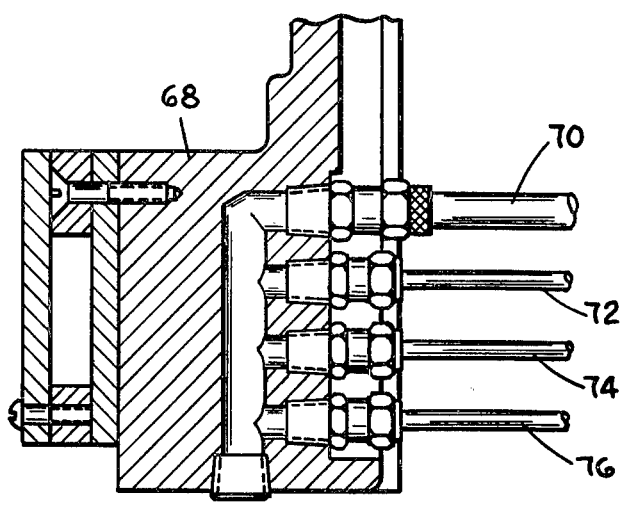
FIG. 6
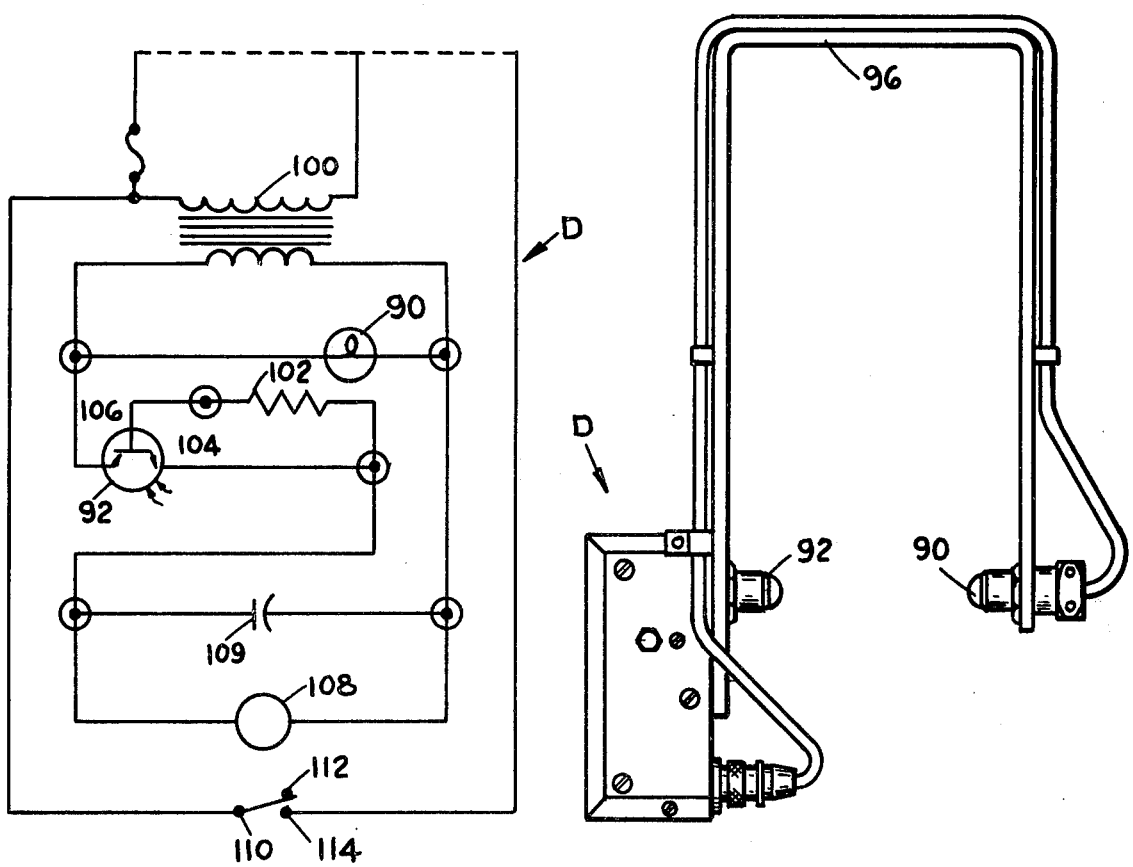
FIG. 8
FIG. 7

AUTOMATIC FEEDING HOPPER

This application is a continuation-in-part of our pending application Ser. No. 319,457 filed Dec. 29, 1972, now abandoned.

FIELD OF THE INVENTION

The invention relates to apparatus for feeding disk-like objects at a fast uniform rate, and is more particularly directed to apparatus or hoppers for the high-speed feeding of bottle crowns.

BACKGROUND OF THE INVENTION

In the field of hoppers for feeding crowns or caps for bottles, the apparatus most commonly used is shown in U.S. Pat. No. 1,932,529, Nagy; Oct. 31, 1933. Apparatus of this kind or variations thereof rely upon gravity and depend on the laws of probability to move crowns through the system. One of the main problems with the Nagy and similar hoppers is that they accept considerably more crowns than are fed out of the machine, and by doing so, the crowns are "churned;" that is, they are tumbled over and over. This leads to what is termed "dusting," which is the result of the lacquer coatings on the crowns becoming abraded by the sharp edges of the stamped crowns.

Many of the troubles or difficulties encountered in the lining of bottle caps or crowns stem from the malfunctions of the hopper. For example, if the hopper doesn't keep the turntable conveyor of the seal liner machine filled, the high-frequency generator which is used to preheat the crowns preliminary to depositing or metering the charges of plastic material into the crowns reacts due to a difference in coil loading. As a consequence, the crowns adjacent to the empty space on the conveyor are either over-heated or under-heated. When that occurs, pellets or charges of the plastic material may bounce out of the crowns or shift off center, and a whole chain of circumstances begin, the final result of which is the shutdown of the machine. Seal liner machines including a turntable conveyor to which hoppered crowns are fed and are heated while on the conveyor are disclosed in U.S. Pat. Nos. 3,135,019; June 2, 1964 and 3,360,827; Jan. 2, 1968, to Alchele.

The Nagy hopper was designed to feed 600 crowns per minute. Today, many crown producers have refined the machine and have achieved production of approximately 850 crowns per minute. Nevertheless, these refined machines, as well as the original Nagy machine have the limitations and disadvantages outlined above. The rate of operation of the seal liner machine described in the aforementioned Aichele, U.S. Pat. No. 3,360,827 has been limited by the rate of operation of hoppers available to feed crowns to the machine.

It has been proposed (French Patent No. 1,114,037; Dec. 12, 1955) to provide a hopper which includes a supply chute, a vibratory feeder, a rotatable bowl and a vertically arranged exit chute which receives objects from the bowl from an intermediate passage. Both the intermediate passage and the exit chute are of a dimension or width to receive a single line of articles or objects processed by the hopper. The exit chute has associated therewith two vertically spaced photoelectric cells. When the level of objects in the exit chute reaches the top cell, the vibratory feeder is stopped. When the light beam at the lower cell is free, the vibratory feeder is turned on.

This prior art hopper has the limitation that when the lower cell starts the vibratory feeder after the last object in the chute has passed, the first object from the newly fed objects will be unable to catch up with the last object, thereby leaving a gap in the objects being fed. As previously indicated, and particularly with reference to the lining of bottle caps or crowns, if the hopper does not keep the turntable conveyor on the seal liner machine filled, there are problems stemming from the high-frequency generator which is used to preheat the crowns. Actually, the prior art apparatus disclosed in the French patent does not include a reservoir which, as will hereinafter be explained, affords a continuous constant stream of crowns or other disk-like objects.

SUMMARY OF THE INVENTION

A hopper made in accordance with the invention eliminates the problems and disadvantages of the Nagy and other hoppers as outlined above because of the ability of the hopper to maintain a flow of crowns through the hopper equal to the demands upon it. There are only very few crowns in the system in excess of the need for them at the exit end of the hopper. The crowns move through the hoppering system from the input end and through the system and to the exit end at a present rate. A balance between input and output is maintained because when input exceeds output, input is shut off until a demand is created. Since, in the same time period, larger quantities are more readily fed at input than at output, the hopper of the invention operates by simply fulfilling demand without maintaining a critcal balance as would be required if the system operated on a continuous flow basis. In operation, the output is constant where there is a stable rate of demand by the machine which is being fed by the hopper. The input is regulated, and is accomplished by a series of start-stop functions that feeds no more than is removed. The crowns are moved in a metered manner through the system. Gravity, together with pressure, are used to convey the crowns or to provide the force for feeding as opposed to strictly gravity. Churning and the resulting dusting, with the attendant problems are eliminated.

The hopper of the invention is capable of operation at speeds up to and in excess of 4,000 pieces per minute, thereby permitting faster operation of existing seal liner machines. Also, the hopper of the invention is operable upon crowns of different sizes without necessitating changes to the hopper thereby reducing downtime of the apparatus.

While the hopper of the invention was devised for the feeding of crowns or bottle caps, the hopper is useful for feeding any disk-like object having a diameter or length or width substantially exceeds the height of the object. Examples of such disk-like objects are washers, rings, ferrules, bearing races, eyelets, square or hexagonal nuts, square or rectangular tapping plates, or the like. These disk-like objects may by symmetrical or asymmetrical. Where the disk-like objects are asymmetrical, an orientation device is included in the hoppering system.

Structurally, the hopper comprises a source of supply or a supply chute, a reservoir for storing the crowns or disk-like objects, feeding means intermediate the supply chute and the reservoir for feeding the disk-like objects to the reservoir, control means responsive to the quantity of disk-like objects in the reservoir connected to the feeding means to maintain a predetermined level of the objects in the reservoir, and conveying means associated with the reservoir for removing the disk-like objects at a uniform rate from the reservoir, and delivering the objects to an exit chute which is adjacent the conveying means and receives the objects in an aligned row.

Where the disks are asymmetrical, for example crowns, eyelets or other parts having a flange which is not central of the piece, an orientation device is positioned at the entrance to the reservoir.

The foregoing objectives, advantages, and improved results will be apparent from the following description of a preferred embodiment of the invention, taken in conjunction with the drawings.

BRIEF DESCRIPTION OF THE DRAWINGS

FIG. 3 is a plan view of the hopper with the supply chute and the vibrator portion of the means for feeding the objects to the reservoir removed;

FIG. 4 is an elevational view, partly broken away and in cross section, of means for orienting crowns as they are fed to the reservoir;

FIG. 5 is a cross-sectional view taken approximately in the plane of line 5—5 of FIG. 4;

FIG. 6 is a view of the manifold for the air lines which are associated with the orientation means to expedite the movement of the disk-like objects or crowns being hoppered, this view being taken in the plane of line 6—6 of FIG. 3;

FIG. 7 is a side elevational view of photoelectric control means which is related to the reservoir for the control of the quantity of objects in the reservoir and in the system;

FIG. 8 is a schematic diagram of the control means or sensor shown in FIG. 7;

DESCRIPTION OF THE PREFERRED EMBODIMENT

As previously indicated, the hopper of the invention is useful for controlling the feeding of any disk-like object having a diameter which substantially exceeds the height of the object; the hopper handles disk-like objects which are either symmetrical or asymmetrical; an orientation device is used where the disks are asymmetrical; and the hopper is particularly suited for supplying oriented crowns to a seal liner machine such as disclosed in the aforementioned Aichele patents. The description which follows will refer to the hoppering of crowns, designated Cr. It will be understood, however, that so designating the disk-like objects in the description and drawings is for convenience only, and is not intended by way of limitation upon the structure about to be described.

Figure 1:
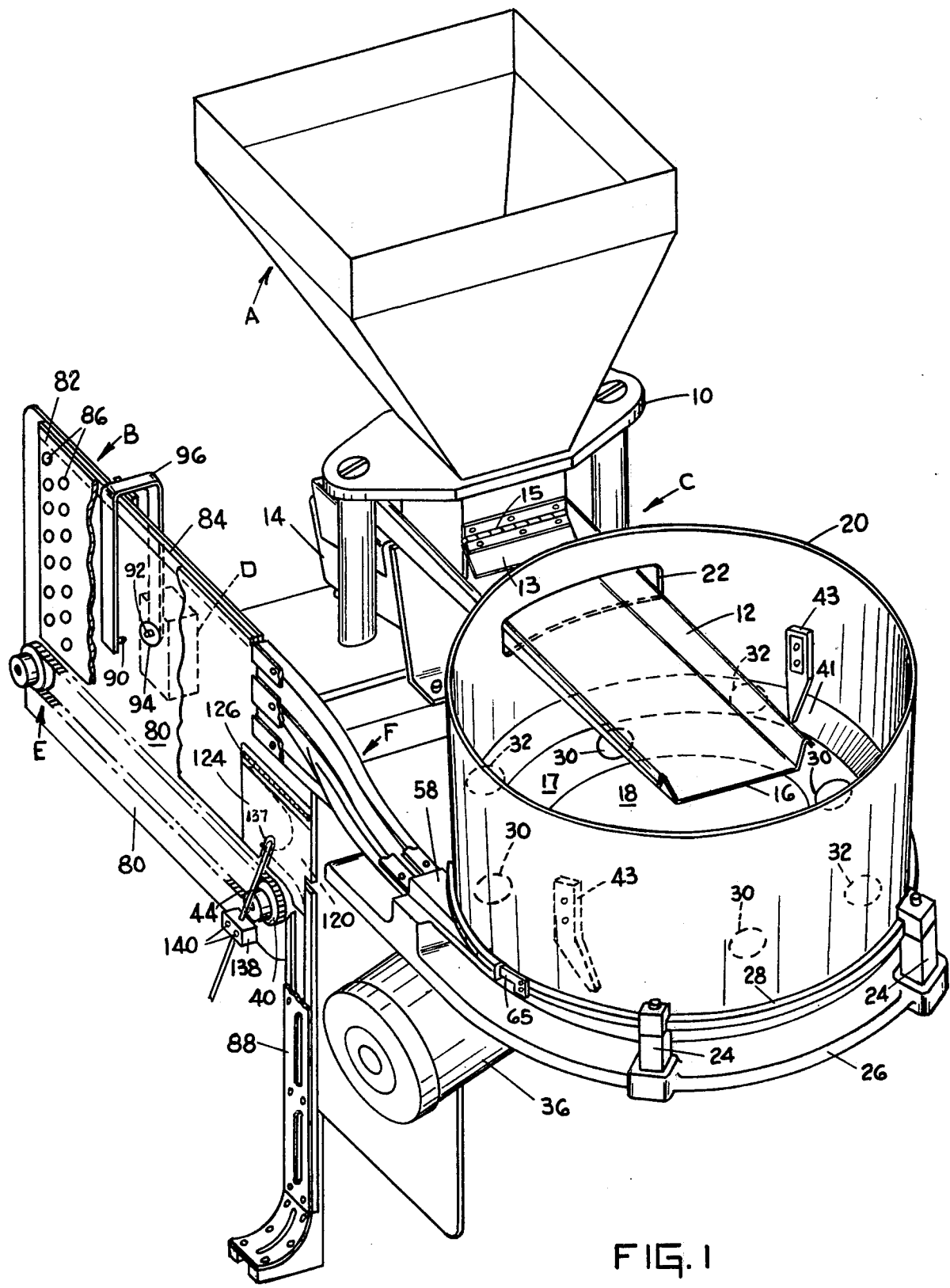
FIG. 1 is a perspective view of a hopper made in accordance with the invention.

Referring to FIG. 1, a hopper made in accordance with the invention comprises a supply chute A, a reservoir B for storing the crowns, and feeding means C located intermediate the supply chute and the reservoir for feeding the crowns to the reservoir. Control means D, which is responsive to the quantity of crowns in the reservoir, is connected to the feeding means to maintain a predetermined level or quantity of crowns in the reservoir. Conveying means E is associated with the reservoir for removing the crowns at a uniform rate from the reservoir. An orientation device F is positioned at the entrance to the reservoir so that the asymmetrical objects or crowns enter the reservoir facing in only one direction to leave the reservoir facing in the same direction. The feeding means C may be a belt conveyor or a vibratory feeder, as shown.

Figure 2:
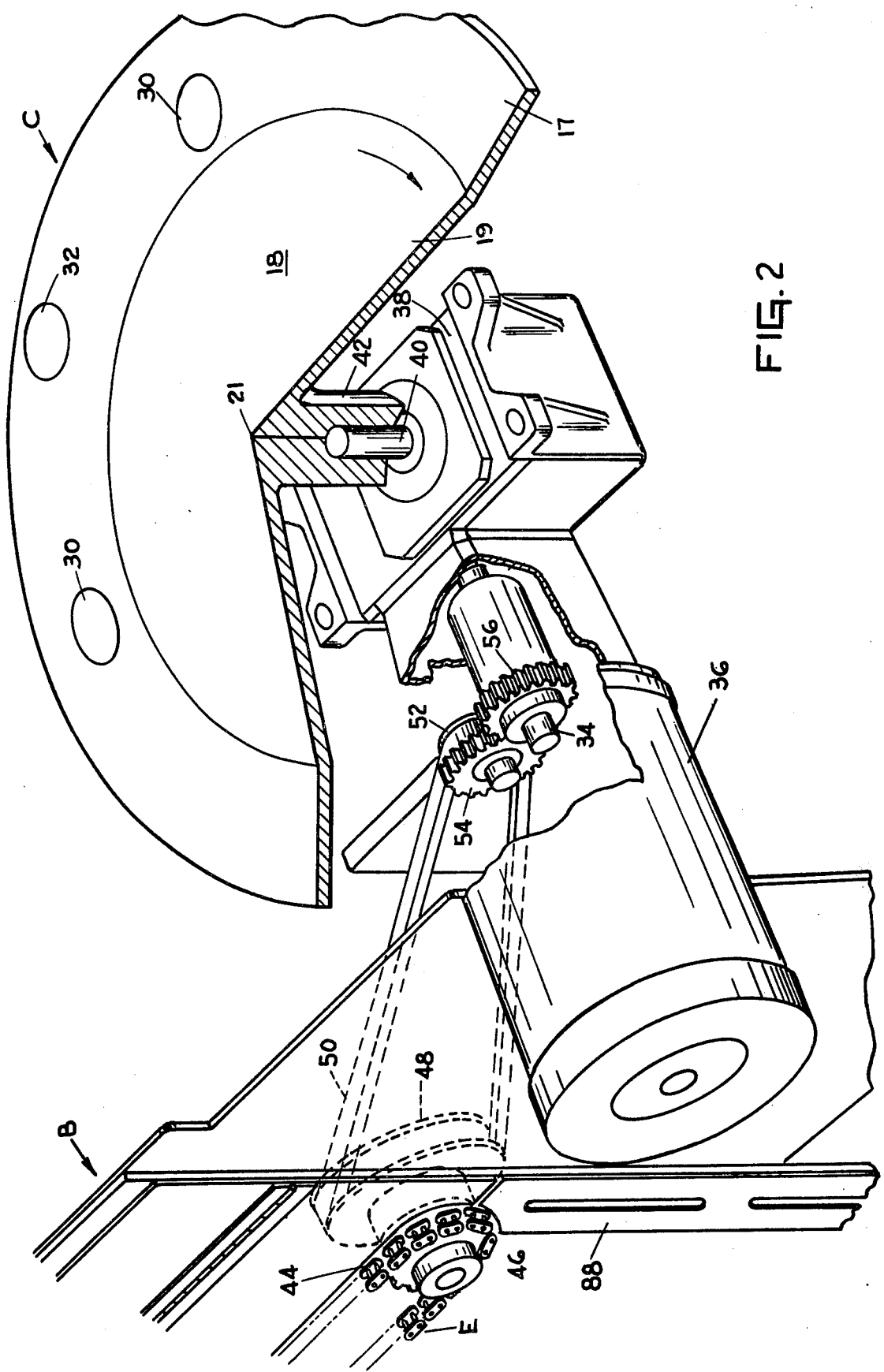
FIG. 2 is a perspective view of a drive-mechanism for rotating the bowl portion of means for feeding disk-like objects to a reservoir and of the means for removing the objects from the reservoir.

In greater detail, and as shown in FIGS. 1 and 2, the supply chute A is suitably supported on a base 10 and related to the feeding means C so that the crowns drop by gravity onto the inclined trough 12 of a vibratory feeder 14. Preferably, a hinged gate is associated with the supply chute to facilitate supplying the disk-like objects to the feeding means. A gate member 13 is hinged to the supply chute at 15. The hinged gate member prevents crowns from bridging at this point and assures a steady flow of parts from the supply chute to the inclined trough.

Figure 9:
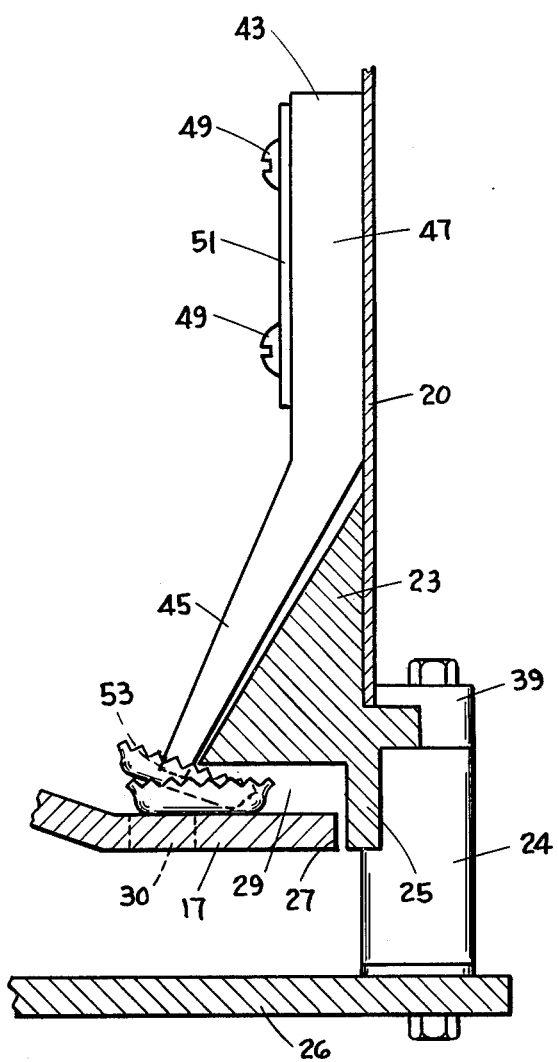
FIG. 9 is an enlarged view, partly in section, taken approximately in the plane of line 9—9 of FIG. 3, this view showing the action of the bumper element finger on crowns which would nest with one another.
Figure 10:
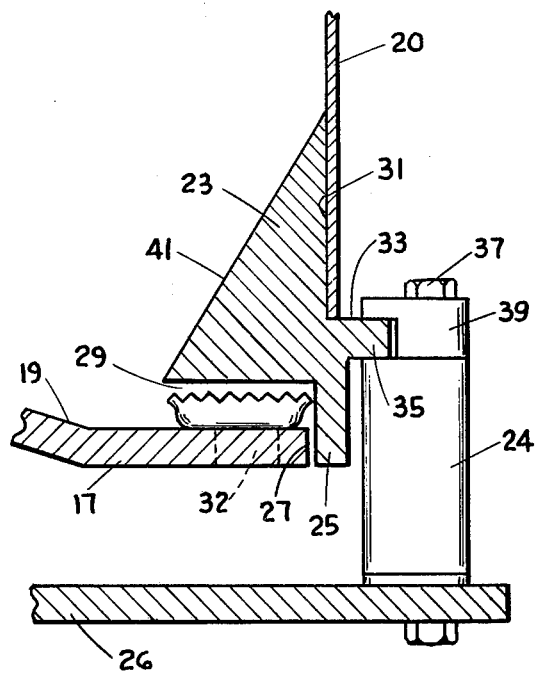
FIG. 10 is an enlarged view, partly in section, taken approximately in the plane of line 10—10 of FIG. 3, this view including the showing of a crown on the bowl of the feeding means.

The vibratory feeder may be of any well-known commercial type such as a Syntron feeder. Feeders of this type utilize an electromagnet energized by pulsating current to attract a leaf spring mounted armature mass to vibrate an inclined trough. In operation, the crowns slide down the vibrating trough and tumble off the edge 16 onto a conically shaped bowl 18. As shown in FIG. 2, the bowl comprises a flat peripheral portion 17 and a conically shaped portion 19 inwardly thereof. The apex 21 of the conically shaped portion is at the center of the bowl. The flat peripheral portion has a width greater than the diameter of a crown. Preferably, the width is approximately twice the diameter of a crown, as shown in FIGS. 9 and 10. The bowl is mounted for rotation in a clockwise direction as viewed in FIGS. 1, 2 and 3. A stationary annular guard 20 is positioned to extend around and above the rotatable bowl as shown in FIG. 1. The guard is provided with a slot 22 to allow the trough to extend therethrough and over the bowl. The guard is held in place by a plurality of circumferentially spaced posts 24 which extend from a support plate 26, and are hooked over a shoulder 28 provided near the lower end of the guard member.

As shown in FIGS. 1 and 2, permanent magnets are set in circumferentially spaced relation in the flat peripheral portion 17 of the bowl. Preferably, there are eight (8) equidistantly spaced magnets, as shown in FIG. 1. Four (4) magnets 30 are positioned on an inner circumference near the intersection of the flat portion and the conically shaped portion of the bowl. The other four (4) magnets 32 are positioned on an outer circumference to lie under the recess to be subsequently described. The magnets thus strategically placed minimize jamming of the crowns as they leave the bowl in their passage toward the reservoir. Also, they break up masses of crowns for more even distribution and ensure that the objects or parts are conveyed through the passage leaving the bowl instead of slipping on the bowl when it rotates.

Preferably, and as illustrated in FIGS. 9 and 10, a stationary ring member 23 is supported adjacent the flat peripheral portion 17 of the bowl. The ring member is formed and related to the flat peripheral portion to provide a vertical wall 25 adjacent the edge 27 of the flat peripheral portion. Also, the ring member is formed and related to the flat peripheral portion of the bowl member to provide a recess 29 having a height slightly greater than the height of a disk-like object. The term "height" is used rather than "thickness" because in the case of a crown the thickness refers to the dimension of the material which is dished in form to make the crown. It will be understood that the term height is the equivalent to thickness where the disk-like object is a washer, bearing race, or other symmetrical object having a uniform dimension perpendicular to its diameter. The stationary ring member 23 is further formed with a side wall 31 and a surface 33 at right angles thereto. The annular guard member 20 is positioned adjacent the wall 31 and with its lower edge sitting on the surface 33 provided by the external flange 35. The ring member is secured in position by positioning the flange 35 on the circumferentially spaced posts 24 the tightening down on the nuts 37 on threaded portions (not shown) extending from the connectors 39, as shown in FIG. 10.

As shown in FIGS. 9 and 10, the stationary ring member 23 is further formed to provide a wall 41 which extends at an acute angle, approximately 45°, with respect to the vertical plane as represented by the annular guard 20. The wall 41 extends from the guard 20 at its upper end to the entrance to the recess at its lower end. The angled wall 41 greatly minimizes jamming at the area where the disk-like objects or crowns leave the bowl when the machine is in operation and the bowl is rotating. The angled wall causes the crowns to fall flat on the rotating bowl. The angled wall 41 and the recess 29 arrangement provided by the stationary ring member 23 practically prevents hollow parts, such as crowns, from "nesting" which causes jams.

To further assist in breaking up masses of parts and to assure a more even distribution of the parts around the rotating bowl when the machine is in operation, a bumper member 43 having a resilient finger portion 45 is positioned to overlie the flat peripheral portion 17 of the bowl 18. As shown in FIG. 9, the bumper member, which preferably is formed of rubber or the like has a base portion 47 which is secured to the stationary guard 20 by extending spaced screws 49 through a plate 51 and through aligned openings in the base portion 47 and into the guard member to secure the part in place. The resilient finger portion 45 extends from the base portion 47 at an angle such that it will break up masses of parts and will assure their even distribution around the rotating bowl. FIGS. 9 and 10 illustrate that the finger 45 is positioned so that its extremity 53 will engage crowns which are positioned on the flat peripheral portion 17 of the bowl which may be in nested condition. However, where individual crowns have entered the recess 29 to a sufficent and suitable extent, as shown in FIG. 10, such crowns are out of the area of operation of the bumper member and its resilient finger portion. In the preferred form of the invention, a pair of bumper members 43 are provided on opposite sides of the bowl, as shown in FIG. 1.

As shown in FIG. 2, a drive mechanism is provided to rotate the bowl 18 and to drive the conveyor E. The shaft 34 of a motor 36 extends to a gear reduction box 38. A shaft 40 extends vertically from the box, and a hub 42 of the bowl 18 is mounted or keyed to the shaft. In the form of the invention illustrated, the conveyor E is a chain and sprocket arrangement 44, 46. The chain 44 is driven by a pulley 48 and belt 50, the belt passing around a second pulley 52 which is geared at 54 to a gear 56 off the main shaft 34 of the motor. While the conveyor or chain is shown so that its upper reach extends in a horizontal plane, it will be understood that the conveyor may be arranged so that the upper reach extends at an angle, for example, 15° with respect to the horizontal, the inclination being downwardly or in the direction of movement of the rotatable member.

Figure 11:
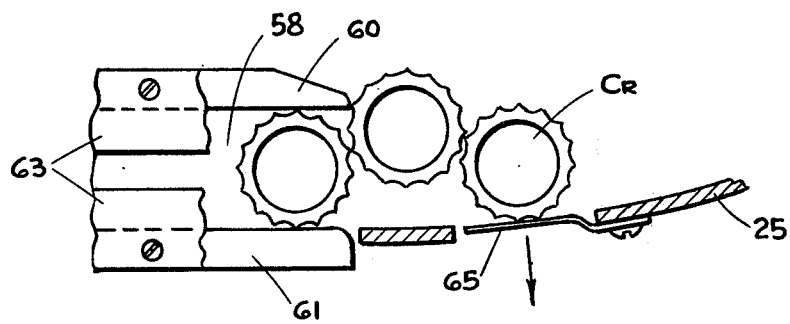
FIG. 11 is an enlarged top plan view showing the passage leading from the bowl into the reservoir or into the orientation means, if used, this view including the showing of crowns.

Referring to FIGS. 1, 3 and 4, the flat peripheral portion 17 adjacent the edge 27 is in communication with a passage 58 tangentially arranged with respect to the bowl's flat portion. This passage, which may be termed an exit passage for the bowl, is in communication with the orientation device F. The passage 58 has a pick-off finger 60 (FIG. 11) positioned to pick off the crowns when the bowl is rotated or spun to aid in conveying the crowns to the exit passage. The passage has a wall 61 on the opposite side and the crowns are confined for movement within the passage by overhanging guide members 63. The passage, of course, has a bottom surface to contain the crowns within the passage. Preferably, and as shown in FIG. 11, the side of the passage opposite the side having the pick-off finger 60 is provided with a spring member 65 just forward of the entrance to the passage. The spring member or plate may be secured to the wall 25 of the ring member 23. The spring plate just ahead of the passage 58 will flex in the direction of the arrow in the event that two crowns may jam against the pick-off finger 60. As a result of the flexing by the spring plate, the movement of the crowns in a single row into the passage 58 is assured.

The orientation device includes a selecting finger 62 which engages a flange of each crown Cr, as shown in FIG. 5. As shown in FIG. 4, some of the crowns face up and some face down when in the exit passage 58. To orient them all the same way, the selecting finger 62 sends them either along a top passage 64 or a bottom passage 66. These passages or tracks twist through 90° so that when the crowns leave the orientation device F and enter the reservoir B they are all oriented in the same direction or with the inside surface of each crown facing outwardly.

To speed or hasten the movement of the crowns through the orientation device, pneumatic or suction means is provided. As shown in FIG. 6, a manifold 68 is provided with an air input line 70 and three output lines 72, 74, and 76 which are respectively connected to the exit passage 58 and the orientation passages 64 and 66. For clarity in illustration, the connection of the lines 72, 74, and 76 to the respective passages is not shown. It will be apparent, however, how these lines are connected to the passages so that air pressure may be used to hasten the movement of the crowns through the passages.

As shown in FIG. 1, the reservoir B comprises a back plate 80 and a cover plate 82. These plates are vertically arranged and are spaced apart a distance slightly greater than the height of a crown. The desired spacing is accomplished by the use of a spacer 84 of appropriate thickness between the back and cover plates at the top and along the sides of the plates. The bottom is left open to allow the presence of the conveying means E which is associated with the reservoir to remove the crowns from the reservoir. Since crowns have sharp edges, it is preferred that the front cover plate be made of steel to resist cutting and abrasion. In such case, the front or cover plate is provided with perforations or openings 86 to allow one to view and inspect the contents of the reservoir during operation of the hopper, and for a purpose to be described.

Where the disk-like objects do not have sharp or cutting edges, the front plate may be glass or a rigid transparent plastic material such as methyl methacrylate, polyethylene terephthalate, cellulose acetate-butyrate, or the like. As shown, a chain and sprocket arrangement is used as the conveying means associated with the reservoir for removing the crowns at a uniform rate from the reservoir. The upper reach of the chain is located to move between the back and cover plates and to fill up the space between the plates with only a slight amount of clearance. Instead of a chain and sprocket arrangement, an abrasion resistant belt of high-friction material and a pulley may be used. The chain delivers the oriented crowns to the exit chute 88 which in turn may be related to the turntable conveyor table of a seal liner machine such as disclosed in the aforementioned Aichele patents.

As shown in FIG. 1, and more particularly in FIGS. 7 and 8, the control means or sensor D, which is responsive to the quantity of crowns in the reservoir B and which is connected to the feeding means C to maintain a predetermined level of the objects or crowns in the reservoir, is arranged with respect to the reservoir so that a light source 90 may direct a light beam through the reservoir to impinge upon a photosensitive device 92. To allow the light beam to pass through the reservoir, the light source is aligned with a perforation 86 in the cover plate located at a predetermined height and with an opening 94 in the back plate. Where the front or cover plate, also the back plate, are of a transparent material such as glass or plastic material, it is, of course, apparent that perforations to allow passage of the light beam are unnecessary. The sensor is contained in a suitable container mounted on one leg of a bracket 96, the other leg having the light source 90 mounted thereon.

Referring to FIG. 8, the control means D comprises a stepdown transformer 100 for converting standard voltage, such as 115 AC, to a 6 volt supply. The light source 90 is energized by the 6 volt supply. The photosensitive element 92 preferably is a light-sensitive silicon controlled rectifier and is connected to the 6 volt supply. A base resistor 102 connects the output terminal 104 to the base 106 of the SCR. A control coil 108 of a control relay is connected in series with the terminal 104 of the SCR. The relay may be of any standard type or a solid state relay. The control coil of the relay controls an armature contact 110 for connection to terminal 112 or 114. Terminal 112 is an open circuit. Terminal 114 is in series with a circuit (not shown) which is operative to control power to the vibratory feeder 14.

Figure 12:
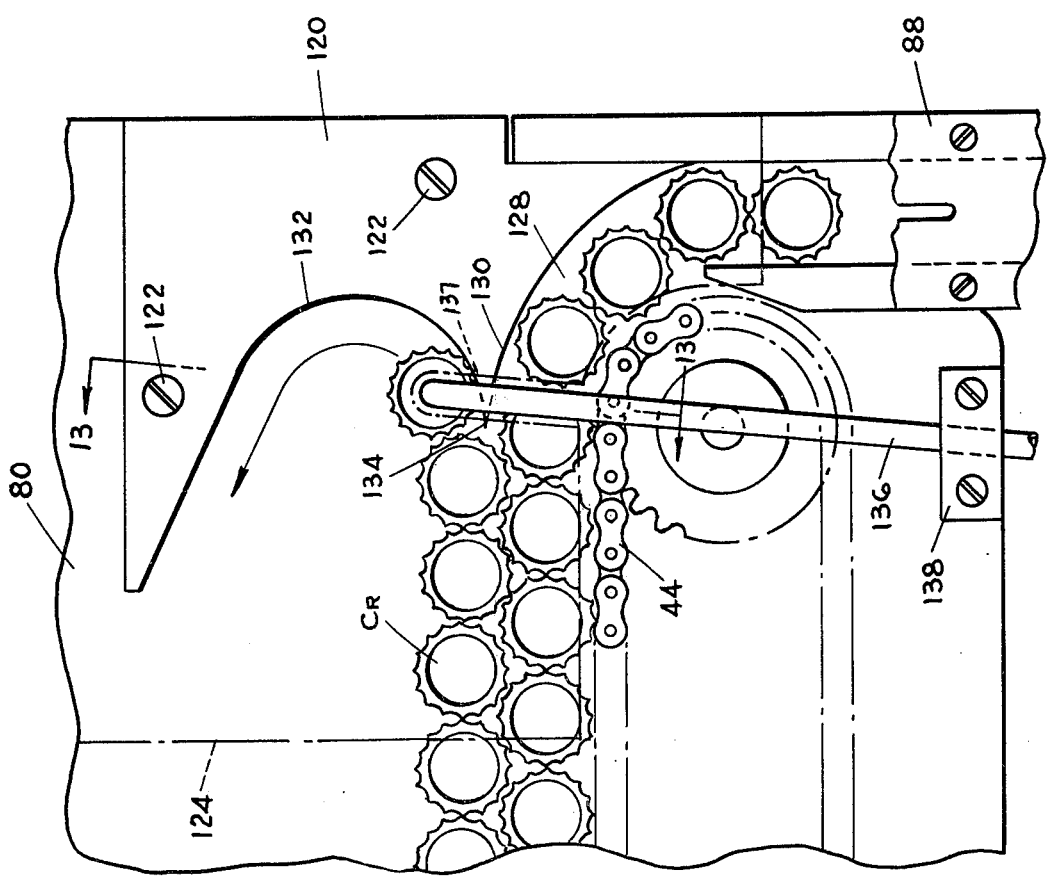
FIG. 12 is an enlarged view showing the deflecting member positioned in the reservoir near the entrance to the exit chute and associated pneumatic means, this view showing a portion of the wall of the reservoir in dot-dash lines.

As will be evident from a viewing of FIGS. 1 and 12, the reservoir B for storing the disk-like objects has a width equal to a plurality of disk-like objects. The width selected for the reservoir depends upon the rate of disk-like objects it is desired to deliver to the exit chute 88 consistant with the attainment of a constant flow of objects from the conveyor at the bottom of the reservoir into the exit chute. Where, for example, it is desired to operate a seal liner machine at the rate of 1,350 cycles per minute and thereby deliver such number of crowns per minute to the machine, a reservoir may be used which has a width substantially equal to the total of the diameters provided by sixteen (16) crowns positioned in substantially edge-to-edge relationship on the chain 44 from the left-hand edge of the reservoir to the center of the right-hand sprocket as viewed in FIG. 1. With an output for the apparatus of the quantity indicated and with the reservoir having a width to accommodate approximately sixteen (16) crowns in a single row on the chain, it has been found that the control means or sensor D may be positioned in a vertical plane so that the light beam is located a distance above the surface of the chain equal to slightly more than the sum of the diameters of two crowns. Thus, in the example give, to operate at a level of 1,350 cycles per minute, a continuous flow is assured with approximately 32–40 crowns in the reservoir. The apparatus of the invention is capable of substantially greater speeds; however, at present the molding plungers on the machine for lining the crowns do not operate satisfactorily when the speed of the machine is in excess of 1,350 cycles per minute.

It has been found that the uninterrupted flow of the crowns or objects resting on the chain 44 into a final single row having movement into the exit chute 88 is further assured by the provision of a deflecting member positioned in the reservoir near the entrance to the exit chute. Preferably, pneumatic means is associated with the deflecting member to further prevent any possibility of jamming of the disk-like objects or crowns at the entrance to the exit chute.

Figure 13:
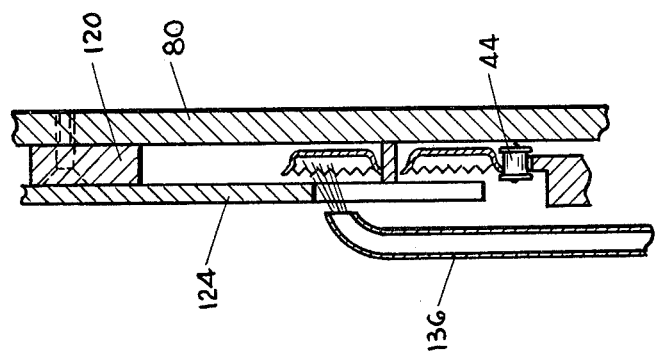
FIG. 13 is a vertical cross-sectional view taken approximately in the plane of line 13—13 of FIG. 12, this view showing the front wall of the reservoir in solid lines.

Referring to FIGS. 1, 12 and 13, the deflecting member 120 is secured to the back plate 80 by screws 122. The front face of the deflecting member is covered by a hinged portion 124 of the front cover plate 82, the portion 124 being hinged at 126 to permit access to the interior of the reservoir at the area immediately above the entrance to the exit chute 88. As shown in FIG. 12, the deflecting member has a configuration to furnish a smoothly curved passageway 128 to guide a single row of crowns from the horizontally arranged rotatable member or chain 44 into the vertically extending exit chute 88. For this purpose, the deflecting member has a concavely curved surface 130. The curved surface 130 is intersected by another concavely curved surface 132, the surfaces meeting at the point 134 which is located a distance above the surface of the chain 44 slightly more than the diameter of a crown. An air line 136 is secured to the back cover 80, the cover extending below the sprocket and chain arrangement, as shown in FIG. 1. The air line which is in the form of copper tubing or the like is secured to and extends through a block 138 which is fastened to the back cover 80 by screws 140 (FIG. 1). A slot 137 is provided in the hinged portion 124 of the front cover plate 82. This arrangement assures that the crowns above the crowns on the conveyor or chain near the exit chute, but not in a position to enter the exit chute, will be circulated back into the reservoir by a blast of air where such crowns may assume the desired position directly on the conveyor. Such crowns follow the curved path provided by the surface 132.

The hopper operates as follows: The motor 36 is turned on so that the bowl 18 is rotating and the conveyor chain 44 is moving at the bottom of the reservoir. The motor (not shown) for the vibratory feeder 14 is turned on so that the feeder is operating. Crowns are maintained in the supply chute A, the crowns falling through the hinged gate 13 onto the upper portion of the inclined trough 12 of the vibratory feeder. The crowns are vibrated down the inclined trough, fall over the edge 16 and onto the rotating bowl 18. The rotation of the bowl causes centrifugal force to be imparted to the crowns urging them into the recess 29 at the outer extemity of the bowl in alignment with the tangentially arranged passage 58. The permanent magnets aid in maintaining the crowns on the outer periphery of the bowl. With the aid of the pick-off finger 60, the crowns move into the passage 58 and then through the passages 64 and 66 of the orientation device so that the crowns enter the reservoir B all oriented identically; that is, with the inside surface facing outwardly or toward the viewer when viewing FIG. 1. The crowns entering the reservoir B fall to the bottom and are moved by the chain 44 to the exit chute 88. The crowns slide down the exit chute 88 and are delivered, for example, to a turntable conveyor of a seal liner machine as shown in the Aichele patents.

The control means D is arranged at a predetermined height on the reservoir B. When the supply of crowns in the reservoir is below the lever of the light source 90 and the SCR 92, the light path is completed from the light source to the SCR. When the photosensitive SCR receives light from the light source, the control element 108 causes the armature 110 to engage contact 114. The power supply circuit is closed and the vibratory feeder 14 continues to operate. When the level and quantity of crowns in the reservoir reaches and extends above the height of the light beam, the barrier of the crowns cuts off the light beam. As a result, the current through the SCR diminishes and the control element 108 causes contact 110 to engage terminal 112, thereby opening the power supply circuit to the vibratory feeder 14. Then, the feeding of crowns at the input end of the system is stopped. It should be noted that the motor 36 operates on an entirely different circuit than the circuit between the sensor and the motor for the vibratory feeder so that the bowl 18 and the chain 44 continue to rotate though the vibratory feeder starts and stops. The supply of crowns in the reservoir diminishes until the height of the crowns falls below the level of the light source 90 and the photosensitive element 92. When the supply of crowns decreases beneath this level, the SCR once again becomes operative. This causes control element 108, which is in series with terminal 104 of the SCR, to be actuated to thereby cause contact 110 to engage terminal 114. The power supply circuit to the vibratory feeder 14 is closed, and the supply of crowns to the bowl, orientation device and reservoir is resumed.

The metering gate 13 on the supply chute; the stationary ring member with its acutely angled wall 41 and the recess 20 which is provided with the flat peripheral portion 17 of the bowl; the bumper or bumpers 43 with their resilient fingers; the spring plate 65 at the exit passage from the bowl; and the deflecting member 120 located at the juncture of the conveying means or chain at the bottom of the reservoir and the exit chute, together with the pneumatic means associated with the deflecting member, each contribute to a hoppering system which assures a constant flow of the disk-like objects through the system.

The described hoppering system ensures that the crowns move through the system at a predetermined and metered rate. The rate of flow of the crowns through the system is set by setting the rate of movement of the chain or belt 44. Due to the described relationship of the control means or sensor with respect to a predetermined level of crowns in the reservoir and the feedback to the vibratory feeder of the feeding means, the input is regulated and the selected predetermined output is maintained constant. The flow of crowns is such that undesirable churning and the resulting dusting are eliminated. Hoppering rates are obtained which have not hitherto been achieved.

It is believed that the advantages and improved results afforded by the hopper of the invention will be apparent from the foregoing detailed description of a preferred embodiment thereof. It will be apparent that various modifications and changes may be made without departing from the spirit and scope of the invention as sought to be defined in the following claims.

We claim:

1. A hopper for disk-like objects comprising a supply chute, a reservoir for storing the disk-like objects, the reservoir being dimensioned to receive a plurality of substantially horizontal rows of disk-like objects in a substantially vertical plane, feeding means intermediate the supply chute and the reservoir for feeding the disk-like objects to the reservoir, control means responsive to the level of disk-like objects in the reservoir connected to the feeding means to maintain a predetermined level of objects in the reservoir, a conveyor adjoining the reservoir for engagement with a substantial portion of the lowermost row of objects in the reservoir and for removing the disk-like objects from the reservoir, the disk-like objects being caused by gravity to engage the conveyor, means for driving the conveyor, and an exit chute adjacent the conveyor to receive the disk-like objects in an aligned row from the conveyor.

2. A hopper according to claim 1, wherein the reservoir comprises a pair of vertically arranged plates spaced apart slightly more than the height of a disk-like object.

3. A hopper according to claim 2, wherein the conveyor comprises a rotatable member positioned to extend between the plates and positioned near the bottom of the plates.

4. A hopper according to claim 3, wherein the feeding means comprises an inclined trough, means for vibrating the trough, and a rotatable bowl beneath the trough, the bowl comprising a flat peripheral portion and a conically shaped portion inwardly thereof.

5. A hopper according to claim 4, wherein the control means comprises a light source and an aligned photosensitive device for sensing the level of objects in the reservoir, the photosensitive device being connected to the means for vibrating the trough.

6. A hopper according to claim 5, wherein drive means is provided for rotating the bowl and the rotatable member, and said drive means is separate from the means for vibrating the trough.

7. A hopper according to claim 5, wherein orientation means is provided between the bowl and the reservoir.

8. A hopper according to claim 7, wherein the orientation means comprises a passage leading from the bowl to a pair of passages leading to the reservoir, one of the pair of passages turning the objects so that the objects entering the reservoir face in one direction; and wherein pneumatic means are associated with the passages to hasten the movement of the objects.

9. A hopper according to claim 8, wherein drive means is provided for rotating the bowl and the rotatable member, said drive means being separate from the means for vibrating the trough.

10. A hopper according to claim 4, including circumferentially spaced permanent magnets set in the flat peripheral portion of the bowl.

11. A hopper according to claim 3, wherein the rotatable member comprises a chain mounted on sprockets.

12. A hopper according to claim 3, wherein the vertically arranged plates are provided with aligned openings at a predetermined height, and the control means comprises a light source and a photosensitive device for sensing the level of the objects in the reservoir, the aligned openings providing a path for a light beam between light source and photosensitive device.

13. A hopper according to claim 2, wherein the vertically arranged plates are of a substantially rigid, transparent material, and the control means comprises a light source and a photosensitive device for sensing the level of the objects in the reservoir, the transparent plates allowing passage of a light beam.

14. A hopper according to claim 1, wherein the feeding means includes a vibratory feeder.

15. A hopper according to claim 14, wherein the control means comprises a light source and a photosensitive device for sensing the level of objects in the reservoir, the photosensitive device being connected to the vibratory feeder.

16. A hopper according to claim 1, wherein orientation means is provided at the entrance to the reservoir.

* * * * *